United States Patent

[11] 3,626,513

| [72] | Inventor | Sylweriusz Pytlak<br>50 Robin Court, West Seneca, N.Y. 14224 |
|---|---|---|
| [21] | Appl. No. | 3,058 |
| [22] | Filed | Jan. 15, 1970 |
| [45] | Patented | Dec. 7, 1971 |

[54] TOOL GUIDE
7 Claims, 8 Drawing Figs.

[52] U.S. Cl. .................................................. 408/115,
408/103, 408/202, 408/97
[51] Int. Cl. .................................................. B23b 47/28
[50] Field of Search .......................................... 408/88, 89,
103, 107, 109, 112, 115, 97, 202

[56] References Cited
UNITED STATES PATENTS
| 1,470,143 | 10/1923 | Buterbaugh .................. | 408/112 |
| 2,849,900 | 9/1958 | Heidtman ..................... | 408/112 |
| 3,534,639 | 10/1970 | Treicher ....................... | 408/112 |

Primary Examiner—Francis S. Husar
Attorney—Christel & Bean

ABSTRACT: A guide body having a passage therethrough for accommodating a tool bit is pivotally mounted between a pair of spaced, upstanding plates secured to a base member. A stop member adjustably threaded into the passage controls the depth of penetration of the tool bit. Lateral projections extend from opposite sides of the guide body through arcuate slots in the plates for receiving fasteners to secure the guide body in a selected angular position relative to the base member. In another form, a pair of rods pivotally mounted adjacent the base member extend through lugs projecting laterally outwardly from opposite sides of the guide body and set screws in the lugs engage the rods for securing the guide body in a selected angular orientation.

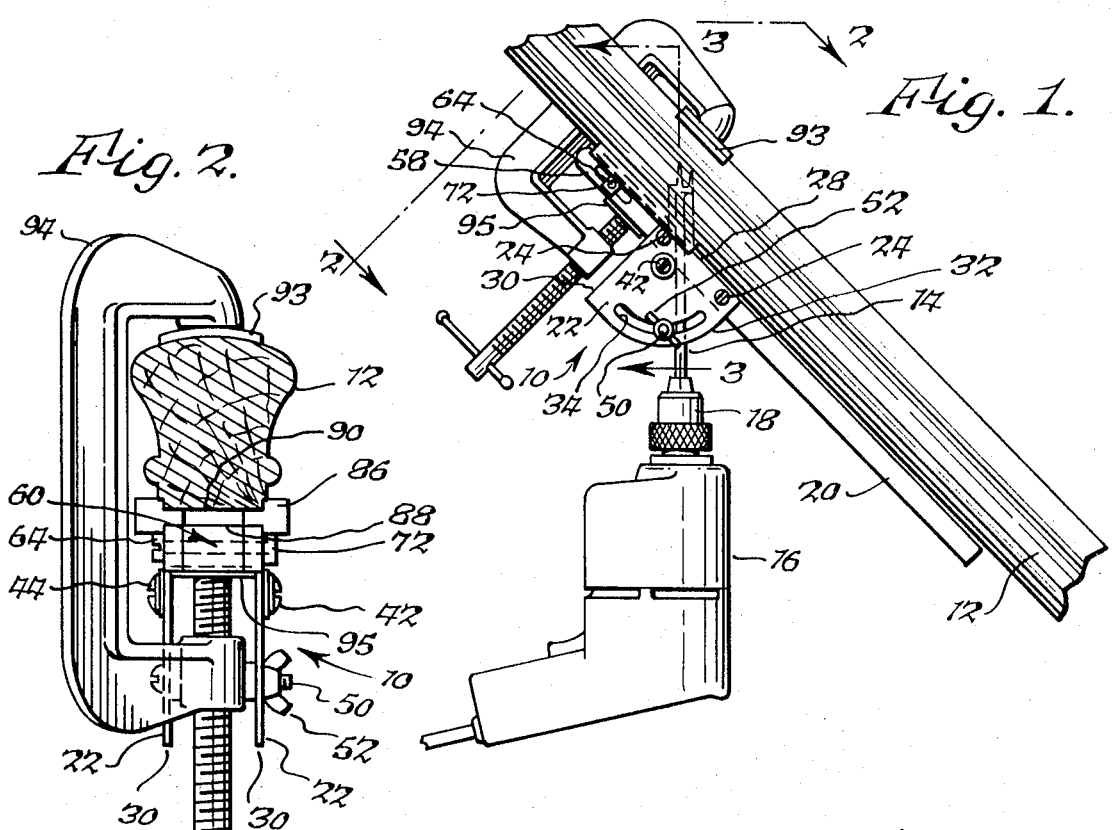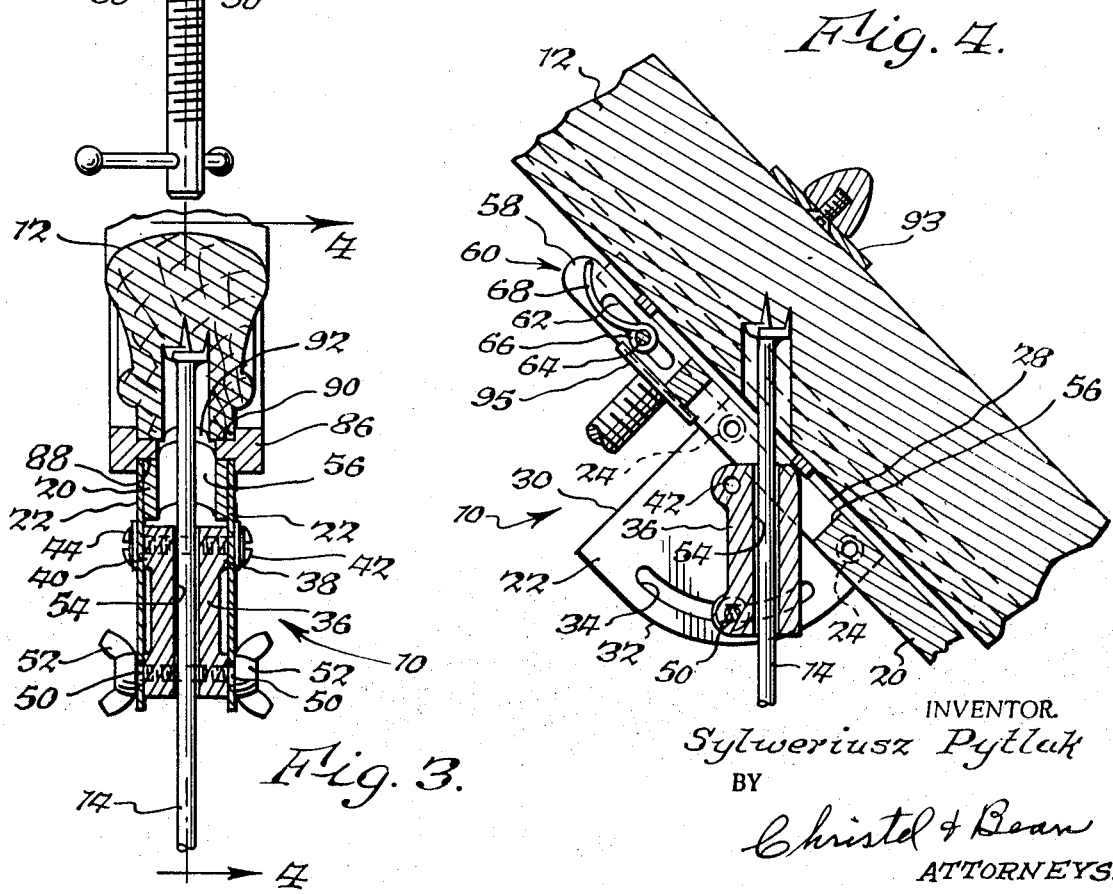

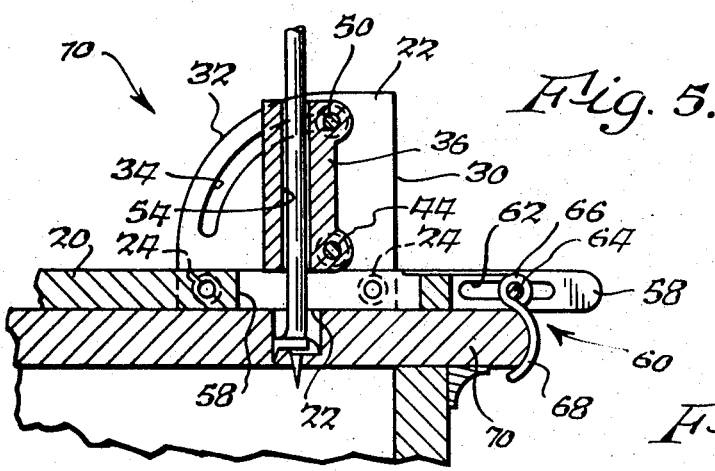
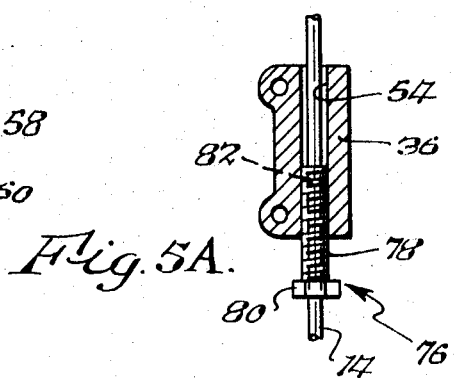
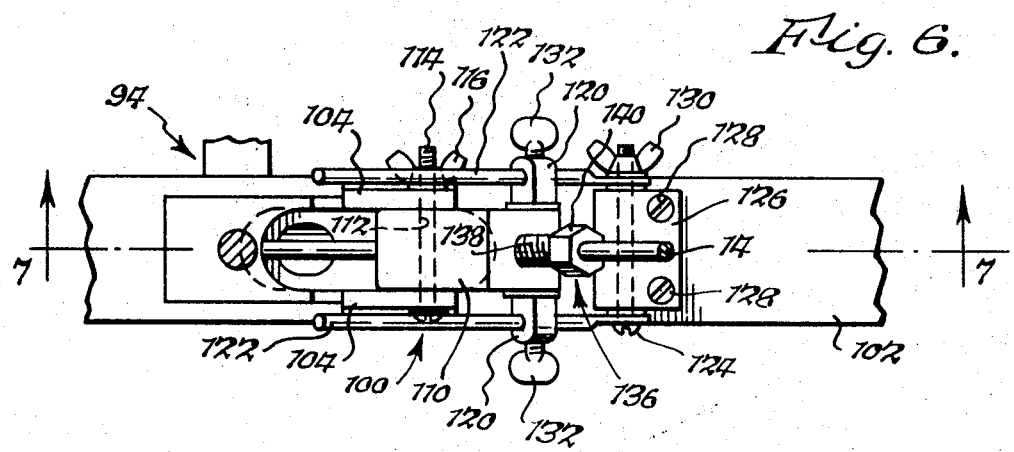

3,626,513

TOOL GUIDE

BACKGROUND OF THE INVENTION

This invention relates to a portable tool guide and, more particularly, to a guide fixture for power hand drills.

In drilling a hole in a work piece with a portable drill, it is often extremely difficult to manually hold the drill at an accurately predetermined angle relative to the workpiece surface, with the result that holes drilled in this manner are sometimes inaccurately directed and offset from their intended orientation.

Although some attempts have been made to solve this problem by employing drill jig fixtures for facilitating the drilling of a hole in a workpiece at an accurate angle, these devices have not been entirely satisfactory because they are complicated in design and construction, expensive to manufacture, and cumbersome and difficult to use.

SUMMARY OF THE INVENTION

It is an object of the present invention to provide an improved tool guide, especially adapted for power hand tools, which is simple and rugged in construction, inexpensive to manufacture, reliable in operation, and easy to use.

It is another object of this invention to provide the foregoing tool guide with adjusting means to orient the drill tool at various selected angles.

It is a further object of the present invention to provide the foregoing tool guide with means for controlling the depth of penetration of the drill bit.

In one aspect thereof, the tool guide of the present invention is characterized by a pivotal guide body having a passage therethrough for receiving and guiding a work tool, the pivotal mounting of the guide body on a supporting structure permitting the work tool to be applied in a wide range of selective angular directions. Means are provided for securing the guide body in the selected angular position relative to a workpiece surface. A stop member is adjustably connected to the guide body passage for controlling the depth of penetration of the work tool.

The foregoing and other objects, advantages and characterizing features of the present invention will become clearly apparent from the ensuing detailed description of certain illustrative embodiments thereof, taken together with the accompanying drawings wherein like reference characters denote like parts throughout the various views.

BRIEF DESCRIPTION OF THE DRAWINGS

FIG. 1 is a side elevational view of the tool guide of this invention, shown attached to a workpiece in the form of a staircase handrail;

FIG. 2 is a sectional view, on an enlarged scale, taken about on line 2—2 of FIG. 1;

FIG. 3 is a vertical view, on an enlarged scale, taken about on line 3—3 of FIG. 1;

FIG. 4 is a vertical sectional view taken about on line 4—4 of FIG. 3;

FIG. 5 is a vertical sectional view of the tool guide of FIG 1 shown attached to the upper surface of a staircase step;

FIG. 5A is a fragmentary vertical sectional view of the tool guide body of FIG 1;

FIG. 6 is a fragmentary top plan view of another form of tool guide of this invention; and FIG. 7 is a vertical sectional view taken about on line 7—7 of FIG 6.

DETAILED DESCRIPTION OF ILLUSTRATIVE EMBODIMENTS

The tool guide of the present invention is especially adapted for powered hand drills used to drill holes at selected angles in specially configured workpieces. For example, in constructing wooden staircases, it is necessary to drill holes at an angle in the underside of an angularly oriented handrail in registry with holes drilled into the upper surfaces of the step platforms for receiving upright support posts extending vertically upwardly between the steps and the handrail. The holes are drilled at longitudinally spaced intervals and must be drilled at the same angle. The tool guide of the present invention, as hereinafter described, insures that all the holes will be accurately drilled at any predetermined angle relative to the workpiece surface. Although it will be convenient to refer to the use of the tool guide of this invention in association in hand drills for drilling holes at selected angles in specially configurated workpieces, it should be understood that the tool guide of this invention is in no manner restricted to such usage nor limited in utility with hand drills only. Rather, the tool guide of this invention has utility in guiding any work tool having an elongated shank directed at an angle into a workpiece surface.

Referring now in detail to the drawings, there is shown in FIG. 1 a tool guide, constructed in accordance with this invention and generally designated 10, attached to the underside of a workpiece in the form of a staircase hand rail 12. Tool guide 10 is adapted to receive and guide a drill bit 14 releasably secured to a powered hand drill 16 by means of a chuck 18.

Tool guide 10 comprises an elongated base member 20 preferably formed of wood and having a pair of laterally spaced sector plates 22 disposed in substantial parallelism suitably secured to opposite sides of base member 20 as by means of screw fasteners 24. Each sector plate 22 has a pair of right angularly related edges 28 and 30 and an arcuate edge 32 defining a quadrant extending through an arc of approximately 90°. An arcuate slot 34, extending generally parallel to edge 32, is provided in each sector plate 22 for a purpose hereinafter explained.

A guide body 36, preferably formed of metal, is pivotably mounted between sector plates 22 and is provided with a pair of embossments 38 and 40 on opposite sides thereof having threaded bores aligned therein for receiving screws 42 and 44 having suitable washers and extending through sector plates 22. In this manner, guide body 36 is pivotable adjacent one end thereof about a transverse axis defined by screws 42 and 44 for adjusting the angular position of guide body 36 relative to base member 20.

A pair of laterally extending threaded studs 50 are provided on the other end of guide body 36 and project through arcuate slots 34 of sector plates 22. Wing nuts 52 are threaded onto studs 50 for clamping engagement with plates 32, thereby releasably securing guide body 36 in the selected angular position. An axial bore 54 is provided in guide body 36 for receiving and guiding a drill bit 14 therein as shown in FIGS. 3, 4 and 5. The outer end portion of bore 54 is threaded for receiving a stop member, hereinafter more fully described.

Base member 20 is provided with an elongated opening 56 for enabling drill bit 14 to pass therethrough for engaging and penetrating the workpiece. The forward end of base member 20 is bifurcated to provide a pair of spaced fingers 58 for accommodating a work-engaging adapter, generally designated 60. Fingers 58 are slotted as shown at 62 in FIGS. 4 and 5 to receive a bolt 64 extending through an end loop portion 66 of adapter 60 about which such adapter 60 pivots. As shown in FIG. 5, adapter 60 has a curved lip portion 68 adapted to engage the curved surface of a workpiece such as the leading edge or nose of a staircase step tread 70, for example. Adapter 60 can be moved longitudinally of base member 20 by means of the bolt and slot arrangement 62, 64 and secured in the selected adjusted position by tightening a nut 72 (FIGS. 1 and 2) on bolt 64.

Means are provided for limiting the depth of penetration of drill bit 14, such means comprising a stop member, generally designated 76, (FIG. 5A) having an externally threaded stem 78 adjustably engageable with bore 54, at least a portion of which is threaded to receive stem 78. Stop member 76 has an enlarged head 80 of a generally hex configuration for receiving a wrench thereon. An axial bore 82 is provided in stop member 76 for receiving the shank of drill bit 14 therein. Head 80 serves as an abutment stop against which chuck 18 engages to limit the depth of penetration of drill bit 14. Thus, by threading stop member 76 into or out of bore 54, the depth of hole desired can be accurately controlled. It should be understood that guide tool 10 can be used without stop member 76, if desired.

In employing tool guide 10 for guiding a drill bit in a specially configured workpiece, such as handrail 12, a work adapter 86 is used in conjunction with tool guide 10, such adapter 86 comprising a body of generally rectangular configuration in plan and having a recess 88 (FIGS. 2 and 4) formed in one side thereof for receiving base member 20. The other side of work adapter 86 is recessed as shown at 90 to conform to the shape of the workpiece against which it bears. It should be understood that a series of work adapters 86 having differently shaped or dimensioned recesses 90 can be employed to accommodate workpieces of various shapes and sizes. Work adapter 86 is provided with an elongated opening 92 generally corresponding in size to base member opening 56 and adapted to be aligned therewith for allowing drill bit 14 to pass therethrough.

In the use of guide tool 10, assume that vertical holes are to be drilled at spaced intervals in the underside of a handrail 12 oriented at a 45° angle as shown in FIG. 1. The underside of handrail 12 is marked at the points where the holes are to be drilled. The shank of a drill bit 14 is inserted into bore 54 at the end adjacent the pivot axis of guide body 36 and extends through stop member 76. A work adapter 86 is placed against handrail 12 and tool guide 10 is positioned in recess 88 of adapter 86. The entire assembly is clamped onto handrail 12 by means of a conventional C-clamp 94 having a portion 93 engaging the opposite side of handrail 12 and a portion 95 engaging the free outer surface of base member 20. To form the first hole, guide body 36 is swung about its pivot axis to the desired angular orientation relative to base member 20 and the workpiece surface. Guide body 36 is secured in the selected angular position by tightening wing nuts 52 on studs 50 projecting through slots 34 in sector plates 22. Stop member 76 is adjusted relative to guide body 36 to determine the depth of penetration required. The free end of drill bit 14 is secured to hand drill 16 by means of chuck 18 and the drilling operation can begin. Drilling continues until chuck 18 engages head 80 of stop member 76 which limits the depth of penetration of drill bit 14. Clamp 94 is loosened and the entire assembly is moved to the next location on handrail 12 with guide body 36 oriented at the proper angle to drill similarly oriented holes at spaced intervals along handrail 12. As earlier mentioned, guide tool 10 can be employed without stop member 76 at the option of the user. Also, hand rail 12 can be placed on a workbench prior to assembly so that the drilling operation is effected in any desired downward angular direction.

When it is desired to drill vertical holes in the upper surface of horizontally oriented workpieces, such as step platform 70 for example, the tool guide of the present invention is used in the manner illustrated in FIG. 5. Base member 20 is positioned directly on the top surface of the step and adapter 60 is slid longitudinally of fingers 58 by means of bolt and slot arrangement 64, 62 until lip portion 68 firmly embraces the leading curved edge of the step platform 70. Nut 72 is then tightened on bolt 64 to secure adapter 60 and lip portion 68 in place. Guide body 36 is pivoted until studs 50 engage the upper end limits of slots 34 orienting guide body 36 and thereby bore 54 in a true vertical disposition. Wing nuts 52 are tightened to secure guide body 36 in place and stop member 76 can be threaded relative to guide body 36 as desired to effect the proper depth of penetration of drill bit 14.

FIGS. 6 and 7 illustrate another form of guide tool of the present invention, generally designated 100 and comprising an elongated base member 102 having a pair of laterally spaced plates 104 mounted on the upper surface of base member 102 by any suitable fastening means (not shown). Each plate 104 has a series of vertically aligned holes 106 in horizontal registry with the holes of the other plate 104.

A guide body 110 is pivotally mounted between plates 104 and is provided with a transverse passage 112 adapted to be aligned with holes 106 in plates 104 for receiving a bolt 114 therethrough having a nut 116 thereon. Thus, guide body 110 is mounted for pivotal movement about a pivot axis defined by bolt 114 to selectively angularly position guide body 110 relative to base member 102 and the workpiece surface. The pivot axis of guide body 110 can be vertically adjusted by selectively using any opposed pair of vertically aligned holes 106.

Means are provided for supporting the upper end of guide body 110 and for locking the same in the selected angular position, such means comprising a pair of pivotally mounted lugs 120 extending laterally outwardly of guide body 110 for sliding engagement on a pair of guide rods 122 extending through suitable openings in lugs 120 and pivotally connected at their lower ends on a bolt 124 extending laterally through a block member 126 secured to the upper surface of base member 102 by suitable fasteners, such as screws 128. Block member 126 has a hole for accommodating bolt 124 and also serves to separate rods 122 at the proper spacing. A wing nut 130 is provided on the threaded end of bolt 124. Set screws 132 are provided in lugs 120 to lock guide body 110 in the selected angular position on rods 122.

Guide body 110 has an axial bore 134 therethrough for receiving and guiding the shank of a drill bit 14. Bore 134 is partially threaded for receiving a stop member, generally designated 136, having a threaded stem 138 and an enlarged head 140. A passage 142 is provided in stop member 136 for receiving the shank of drill bit 14 therein. Stop member 136 is constructed similarly to stop member 76 and functions in the same manner to control the depth of penetration of drill bit 14. Of course, tool guide 100 can be used without stop member 136, if desired.

Base member 102 is provided with an elongated opening 140 therethrough for enabling drill bit 14 to pass therethrough and for accommodating any angular orientation of drill bit 14. Although base member 102, side plates 104, and guide body 110 are preferably formed of wood, any suitable, rigid material such as metal, plastics, etc. can be used in lieu of wood, if desired.

In use and operation, tool guide 100 is used similarly to tool guide 10 in guiding a drill bit 14 at the correct selected angular direction into the surface of a workpiece, such as handrail 12. In connection with such use on a specifically configured workpiece, a work adapter 86', similar to the adapter 86 first described, can be used, it being understood that the recesses in adapter 86' can vary to accommodate different shapes and sizes of work and various width dimensions of base member 102. Also, a C-clamp 94 is employed to hold the guide tool 100 and adapter 86' in clamping engagement against the workpiece surface. As shown in FIG. 7, handrail 12' is oriented 180° from its normal position of use and laid flat on a workbench or table to facilitate the drilling operation.

From the foregoing, it is apparent that the present invention fully accomplishes its intended objects. As a result of the present invention, an improved tool guide is provided for guiding a work tool at various selected angles relative to the workpiece surface and maintaining such selected angular disposition of said tool guide for a series of work operations. By the provision of a stop member, the depth of penetration of a work tool can be effectively controlled.

Preferred embodiments of this invention having been disclosed in detail, it is to be understood that this has been done by way of illustration only.

I claim:

1. A portable tool guide comprising an elongated base, a pair of spaced plates secured to said base, an elongated guide body having an axial passage therethrough for receiving and guiding a tool bit, said base having an opening for the passage of said tool bit therethrough, said guide body substantially spanning the space between said plates, pivot means extending transversely through said guide body adjacent one end thereof and through said plates for pivotally mounting said guide body on said plates enabling said guide body to move angularly relative to said plates, and means spaced from said pivotal mounting means for releasably securing said guide body in a selective angular position relative to said base.

2. A portable tool guide according to claim 1 wherein said base is bifurcated at one end thereof to provide a pair of laterally spaced fingers, an adapter pivotally mounted at one end thereof between said fingers, the other end of said adapter being provided with a lip portion adapted to engage the leading edge of a workpiece.

3. A portable tool guide according to claim 1 wherein said pivot means includes a bolt passing through said guide body, and said plates are provided with a plurality of laterally aligned openings whereby said bolt is selectively positioned in any pair of aligned openings to vary the pivot axis of said guide body.

4. A portable tool guide according to claim 3 wherein said releasably securing means comprises a pair of rods pivotally mounted adjacent one end on said base, and a pair of lugs extending laterally from said guide body, said rods passing through openings provided in said lugs, and fasteners on said lugs for engagement with said rods.

5. A portable tool guide according to claim 1 in combination with an adapter having a generally rectangular recess in one side thereof for receiving said base and a recess in the opposite side thereof conforming to the shape of a workpiece.

6. A portable tool guide according to claim 3 in combination with an adapter having a generally rectangular recess in one side thereof for receiving said base and a recess in the opposite side thereof conforming to the shape of a workpiece.

7. A portable tool guide comprising a base, a pair of spaced plates secured to said base, a guide body having a passage for receiving and guiding a tool bit, means pivotally mounting said guide body between said plates for enabling said guide body to move angularly relative to said plates and means spaced from said pivotal mounting means for releasably securing said guide body in a selective angular position relative to said base, means releasably secured to said guide body for controlling the depth of penetration of said drill bit, said controlling means comprising a stop member having a stem adjustably threaded into said passage of said guide body, an enlarged head on said stem, and an axial passage in said stop member for receiving and guiding a tool bit therethrough.

* * * * *